US006038603A

United States Patent [19]
Joseph

[11] Patent Number: 6,038,603
[45] Date of Patent: Mar. 14, 2000

[54] PROCESSING CUSTOMIZED UNIFORM RESOURCE LOCATORS

[75] Inventor: Joshy Joseph, Union City, Calif.

[73] Assignee: Oracle Corporation, Redwood Shores, Calif.

[21] Appl. No.: 08/824,362

[22] Filed: Mar. 25, 1997

[51] Int. Cl.[7] ............................. G06F 13/38; G06F 15/17
[52] U.S. Cl. ......................... 709/228; 709/230; 709/236; 370/465; 370/470; 370/471; 370/472; 370/473; 370/474; 370/475; 370/476
[58] Field of Search .................................... 395/831, 200; 709/220, 228, 230, 236, 303, 304; 370/465, 469, 431, 435, 470, 471, 472, 473, 474, 476

[56] References Cited

U.S. PATENT DOCUMENTS

| | | | |
|---|---|---|---|
| 5,355,506 | 10/1994 | Mariani .................................... | 395/800 |
| 5,416,842 | 5/1995 | Aziz ......................................... | 380/30 |
| 5,416,905 | 5/1995 | Mori et al. .............................. | 395/200 |
| 5,483,596 | 1/1996 | Rosenow et al. ........................ | 380/25 |
| 5,537,417 | 7/1996 | Sharma et al. ......................... | 370/94.1 |
| 5,586,117 | 12/1996 | Edem et al. ............................ | 370/466 |
| 5,636,333 | 6/1997 | Davidson, Jr. et al. ................ | 395/114 |
| 5,781,431 | 7/1998 | Duret et al. ............................ | 714/811 |
| 5,815,722 | 9/1998 | Kalwitz et al. ......................... | 395/712 |
| 5,822,434 | 10/1998 | Caronni et al. ......................... | 380/49 |
| 5,822,521 | 10/1998 | Garner et al. ........................... | 709/230 |
| 5,826,018 | 10/1998 | Vixie et al. .............................. | 709/230 |
| 5,848,233 | 12/1998 | Radia et al. ........................ | 395/187.01 |
| 5,848,415 | 12/1998 | Guck ....................................... | 707/10 |
| 5,855,020 | 12/1998 | Kirsch ..................................... | 707/10 |
| 5,898,733 | 4/1999 | Satyanarayana ........................ | 375/202 |

OTHER PUBLICATIONS

Scott D. Alexander et al., Active Bridging, Sigcomm 97; http://www.cis.upenn.edu/~switchware/activebridge/, 11 pages, Sep. 18, 1997.

David L. tennenhouse et al., Towards an Active Network Architecture, Computer Communication Review vol. 26 No. 2; http://www.tns.ics.mit.edu/publications/ccr96.html, 14 pages, Apr. 1996.

David J. Wetherall et al., The active IP Option, Proc. of the 7th ACM SIGOPS European Workshop; http://www.tns.ics.mit.edu/, 8 pages, Sep. 1996.

Ashar Aziz et al., Simple Key– Management for Internet Protocols (SKIP), http://www.isoc.org/html/paper/244/abst.html, 6 pages, Aug. 7, 1995.

Christian F. Tschudin, Comscript—Concept and Language, http://tioswww.unige.ch/tios/coms.html, 19 pages, Nov. 1992.

*Primary Examiner*—Frank J. Asta
*Assistant Examiner*—Bunjob Jaroenchonwanit
*Attorney, Agent, or Firm*—Stattler, Johansen & Adeli LLP

[57] ABSTRACT

A first computer system determines whether a URL contains a first value corresponding to an encapsulating protocol. If the URL contains a value corresponding to an encapsulating protocol, the first computer system determines whether the URL contains an operation protocol key indicating that the URL contains a second value corresponding to an operation protocol. If the URL contains a second value corresponding to an operation protocol, the first computer system selects the operation protocol as the protocol to be employed by the first computer system in issuing a communication to a second computer system. A second computer system determines whether a URL it receives contains a first value corresponding to an operation protocol. If the URL contains a first value corresponding to an operation protocol, the second computer system provides a resource targeted to a first computer system in accordance with an encapsulating protocol. The encapsulating protocol is identified by a second value in the URL, and the resource is provided from a resource store that is accessed in accordance with the operation protocol.

29 Claims, 10 Drawing Sheets

PROCESSING CUSTOMIZED UNIFORM RESOURCE LOCATORS

BACKGROUND OF THE INVENTION

A. Field of the Invention

The present invention is directed towards the field of communications network systems, and more particularly towards accessing information in communications network systems that employ a plurality of protocols.

B. Description of the Related Art

Communications networks link together the information and resources of many computer systems. Increasing use of communications networks has created a need for efficient management and sharing of resources in a network environment.

Figure 1:
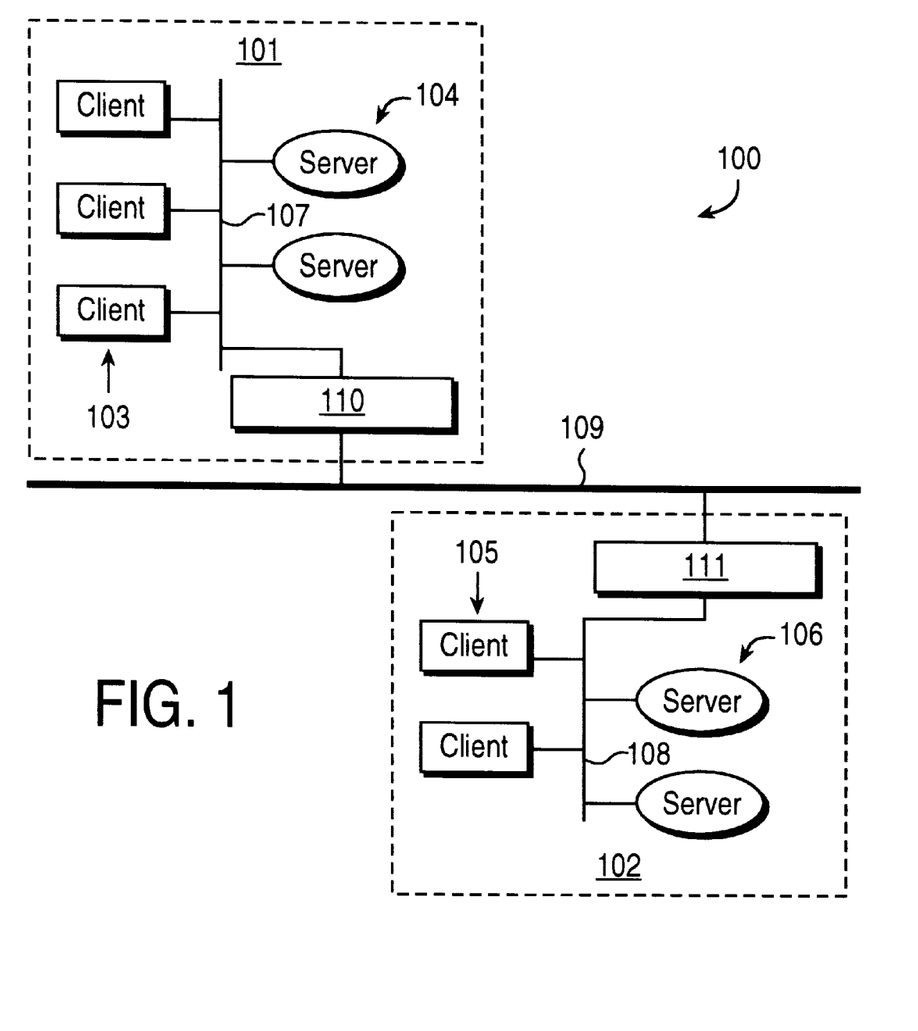
FIG. 1 illustrates a client server communications network.

FIG. 1 illustrates a communications network 100 including a first communications network 101 and a second communications network 102. The first communications network 101 may be identified as first sub-network 101, and the second communications network 102 may be identified as second sub-network 102.

The first sub-network 101 includes a number of client computer systems 103 and a number of server computer systems 104. Each of the clients 103 and servers 104 are coupled to a communications medium 107 that provides for the physical transfer of information between the clients 103 and the servers 104. The second sub-network 102 is similarly comprised of client computer systems 105, server computer systems 106, and a communications medium 108.

Each sub-network 101, 102 is coupled to a networking backbone medium 109 through a respective enterprise networking device 110, 111, such as a router or gateway. An enterprise networking device 110, 111 provides for the transfer of information between sub-networks 101, 102 over the backbone medium 109. Additional sub-networks may be linked to the backbone 109 to expand the size of the overall communications network 100.

The clients 103, 105 and servers 104, 106 are computer systems capable of executing an operating system. The operating system provides for the execution of application programs that enable the generation, retrieval, storage, and manipulation of information, such as data, voice, and video signals. The operating system, application programs, and information are resources that may be either maintained within each client or centrally maintained in a server.

In a client-server environment, as shown in the first sub-network 101 and second sub-network 102, the servers may maintain most of the resources utilized by the clients. Clients 103 employ the local communications medium 107 to both retrieve resources from the local servers 104 and store resources on a the local servers 104. Clients 103 in the first sub-network 101 utilize the backbone 109 to access resources on remote servers 106 that reside on the second sub-network 102.

Instead of merely storing resources in traditional file systems, a server may maintain the resources in sophisticated databases, such as relational databases. This enhances the ability of a client to effectively utilize the resources and share the resources with other clients.

A client employs a browser to access resources that are available on servers. A browser is an application program that allows a client to either uniquely identify a desired resource or identify key information associated with a desired resource. Based on the data used to identify the desired resource, the browser places a request on the communications network 100. The request indicates that the browser wishes to be notified of resources, such as files, within the communications network 100 that have the unique identity or key information provided by the browser's user. Servers on the communications network 100 respond to the browser's request by identifying resources or providing resources that are responsive to the request.

Resources may be uniquely identified through the use of a uniform resource locator ("URL"). A URL is a set of data that is combined together to uniquely identify a resource. For example, a URL may indicate a server on which the resource is located, the file name of the resource, and the protocol to be used in retrieving the resource. A server may respond to a browser's request by providing the browser with a URL. Upon receiving the URL, a browser employs the data in the URL to request the identified resource. In addition to identifying resources, uniform resource locators may be used for supplying information and other resource to targeted clients and servers.

Figure 2A:
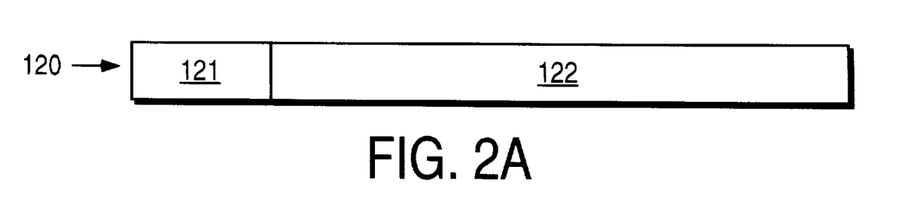
FIG. 2A illustrates a format of a traditional uniform resource locator.

FIG. 2A illustrates a traditional URL 120. The first field in the URL 120 is a protocol field 121, which contains a value corresponding to a protocol. The client will use the protocol to communicate with a server containing a resource identified by the URL 120. There are several standard protocols that are supported by most browsers. Examples of some standard protocols include file, file transfer protocol ("ftp"), gopher, hypertext transport protocol ("http"), mailto, news, nntp, and telnet.

The second field 122 in the URL 120 is a resource identifier field 122. This field is composed of several elements that combine to identify a desired resource. The elements in the resource identifier field 122 vary depending upon the protocol identified in the protocol field 121.

Figure 2B:
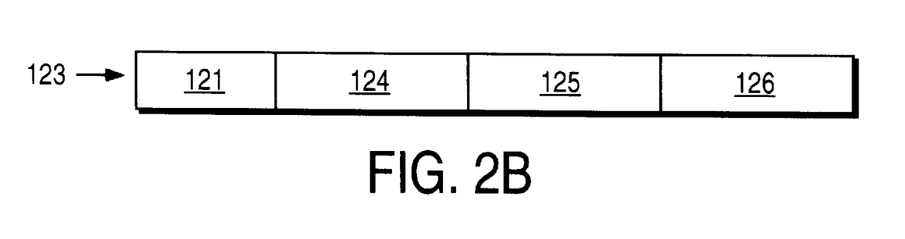
FIG. 2B illustrates a format of a uniform resource locator in accordance with the hypertext transport protocol.

FIG. 2B illustrates a URL 123 having a protocol field 121 loaded with a value corresponding to the hypertext transport protocol. The resource identifier field 122 includes a machine:port field 124, a path field 125, and a file name field 126. The machine:port field 124 contains a value identifying a computer system containing the desired resource. Field 124 may also include a value corresponding to the port used for connecting to the identified computer system over the communications network 100. If a port value is not provided, a default port value will be employed.

The path field 125 contains a value identifying a directory path in the computer system identified in the machine:port field 124. The directory path contains the desired resource. The file name field 126 contains a value identifying the file name of the desired resource.

Figure 2C:
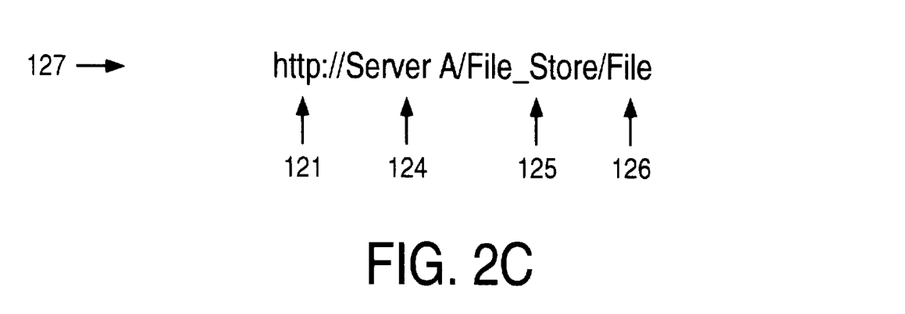
FIG. 2C illustrates an example of a hypertext transport protocol uniform resource locator.

FIG. 2C illustrates the typical nomenclature used to represent a URL 127. The protocol field 121 contains a value corresponding to the http. The machine:port field 124 contains a value identifying Server A. Since no port value is provided, a default port on Server A will be employed. The path field 125 identifies a directory in Server A called "File_Store", and the file name field 126 identifies a file named "File".

Based on the information provided in URL 127, a browser would make a request directed to Server A over the communications network 100 in accordance with the http protocol. The request would be in the form of the URL in FIG. 2C. In response to the request, Server A would provide the browser with a resource named "File" from its "File_Store" directory.

The protocols used within a sub-network to form client-server communications links may be selected to best suit the majority of operations performed on the sub-network. In fact, it may be desirable for a client to form communication links with each server using a different protocol. This would allow each server to maintain communication links using a protocol that provides the best support for the function being performed by the server.

For example, a first server may primarily perform electronic mail functions. A second server may primarily perform scheduling functions. A first protocol may be best suited for electronic mail functions, and a second protocol may be best suited for scheduling functions. Accordingly, client interaction with the first server may be governed by the first protocol, and client interaction with the second server may be governed by the second protocol. Based upon the functions being performed by each server, it may also be beneficial to employ protocols other than the standard protocols listed above.

However, a non-standard protocol may not be supported by traditional browsers employed on some of the clients in a communication network 100. For example, the first sub-network's 101 clients 103 may or may not each employ a browser that supports all the protocols employed by the first sub-network's servers 104. The clients 105 in the second sub-network 102 may or may not each employ a browser that supports all the protocols employed by the first sub-network's servers 104. A first client on the first sub-network 101 may send a second client on either the first or second sub-network an electronic mail message. The message may include a URL identifying a resource located on a server in the first sub-network 101. The browser on the second client may not be able to successfully request and receive the identified resource, if the protocol identified in the URL's protocol field is not supported by the second client's browser.

Accordingly, it is desirable to have a mechanism for generating a URL that provides for the use of nonstandard protocols. It is also desirable to have a mechanism for enabling a computer system to process a URL that identifies a protocol not universally supported by all browsers.

SUMMARY OF THE INVENTION

Embodiments of the present invention provide a mechanism for generating a URL that enables non-standard protocols to be employed in a communications network. In accordance with the present invention, computer systems in the communications network may be enabled to utilize such a URL. Embodiments of the present invention also provide a mechanism for enabling a computer system to employ such a URL independent of the capability of the computer system's browser to support non-standard protocols.

A first computer system may perform an operation over a communications network based on a URL. A protocol may be employed by the first computer system to access a second computer system over the communications network. In order to access the second computer system, the first computer system initially determines whether the URL contains a first value corresponding to an encapsulating protocol.

If it is determined that the URL contains a value corresponding to an encapsulating protocol, the first computer system determines whether the URL identifies an operation protocol. This may be achieved by determining whether the URL contains an operation protocol key value indicating that the URL contains a value corresponding to an operation protocol.

If an operation protocol is identified by the uniform resource locator, the first computer system selects the operation protocol as the protocol to be employed in accessing the second computer system.

A computer system may process a URL received from a first computer system over a communications network. In performing such processing, the computer system determines whether the received URL contains a first value corresponding to an operation protocol.

If the URL contains a first value corresponding to an operation protocol, the computer system provides a resource targeted to the first computer system in accordance with an encapsulating protocol. The encapsulating protocol is identified by a second value in the URL. The resource is provided from a resource store that is accessed in accordance with the operation protocol.

BRIEF DESCRIPTION OF THE DRAWINGS

Further details of the present invention are explained with the help of the attached drawings in which.

DETAILED DESCRIPTION

A. A Uniform Resource Locator

Figure 3A:
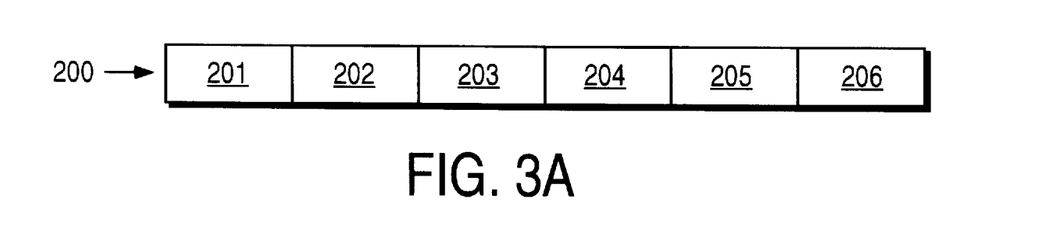
FIG. 3A illustrates a format of a uniform resource locator for use with embodiments of the present invention.

FIG. 3A illustrates a format for a uniform resource locator 200 in accordance with the present invention. The URL 200 enables both an operation protocol and an encapsulating protocol to be specified. The operation protocol is a protocol employed to access a computer system, such as a server or client, which is maintaining a resource identified in the URL 200. The encapsulating protocol may be employed by a browser that does not support the operation protocol. The browser may employ the encapsulating protocol to issue a request to a machine identified in the URL 200 that is capable of accessing a computer system in accordance with the operation protocol.

The URL 200 in FIG. 3A includes an encapsulating protocol field 201, a machine:port field 202, an operation protocol key field 203, an operation protocol field 204, a path field 205, and a file name field 206. The encapsulating protocol field 201 contains a value corresponding to an encapsulating protocol. In one embodiment of the present invention, the encapsulating protocol is the hypertext transport protocol.

The machine:port field 202 contains a value corresponding to a computer system and a port within the computer system. The computer system identified in the machine:port field 202 has the capability to use an operation protocol, which is identified in the URL 200, to access another computer system, such as a server. If a port is not specified, a default port may be employed.

The operation protocol key field 203 contains a value indicating that an operation protocol field 204 exists in the URL 200. The operation protocol field 204 contains a value corresponding to an operation protocol. The path field 205 contains a value indicating a location in a computer system that contains a desired resource.

In one embodiment of the present invention, the path field 205 may include a value indicating a computer system to be accessed using the operation protocol. In an alternate embodiment of the present invention, the operation protocol itself identifies a computer system to be accessed using the operation protocol. The computer system being accessed using the operation protocol may be a client computer system or a server computer system residing in a communications network.

The file name field 206 contains a value identifying a desired resource, which is to be accessed using the operation protocol. In alternate embodiments of the present invention, the URL 200 may include fields for appending information, queries, or forms that are to be presented to a computer system in accordance with the operation protocol.

Figure 3B:
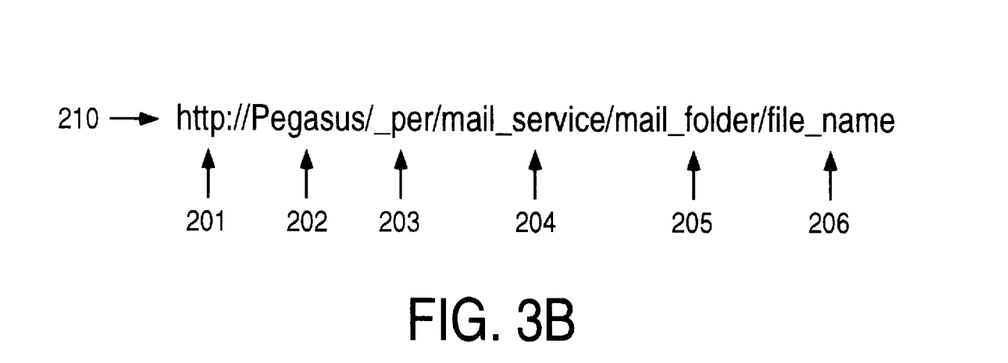
FIG. 3B illustrates an example of a uniform resource locator that may be employed in accordance with the present invention.

FIG. 3B illustrates an example of a URL 210 that may be constructed in accordance with the present invention. The encapsulating protocol field 201 contains a value corresponding to http. The machine:port field 202 contains a value corresponding to a computer system identified as "Pegasus". No port is expressly identified, so a default port in "Pegasus" will be employed. The operation protocol key field 203 contains a value "_per", which indicates that an operation protocol field 204 is present in the URL 210. The operation protocol field 204 contains a value corresponding to a "mail_service" protocol. The path field 205 contains a value indicating that a desired resource is located in a "mail_folder" resource store in a computer system supporting the "mail_service" protocol. The file name field 206 contains a value identifying a resource named "file_name" in the "mail_folder".

Figure 4:
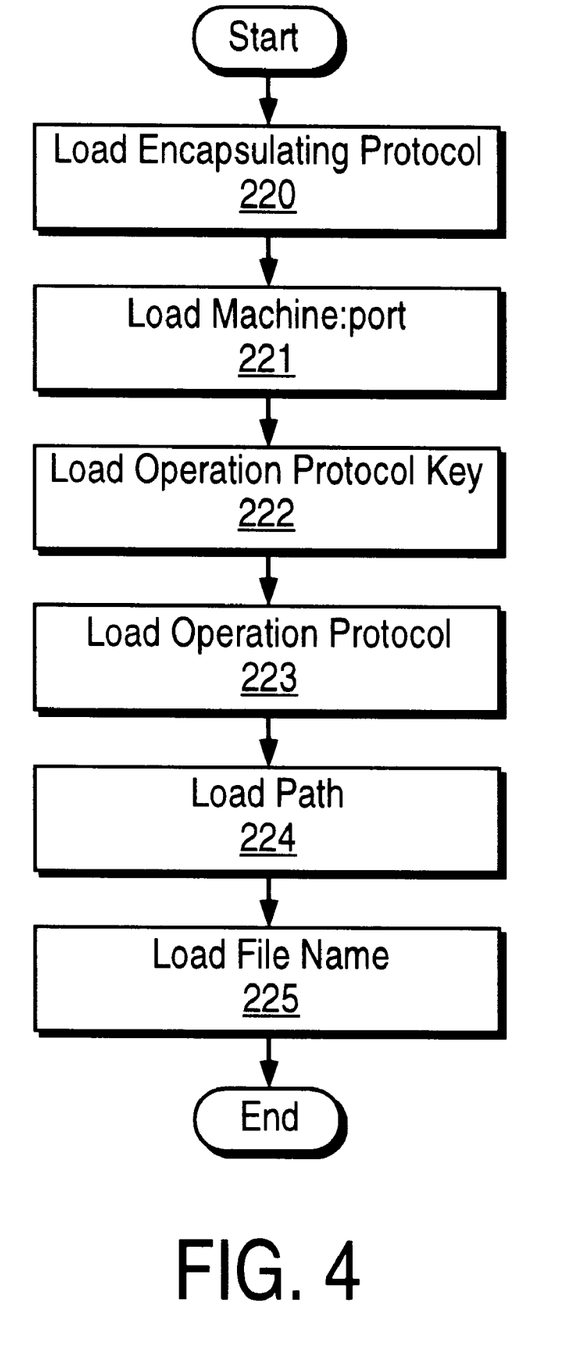
FIG. 4 illustrates a sequence of operations for a process performed by a computer system to construct a uniform resource locator in accordance with the present invention.

FIG. 4 illustrates a process for constructing a URL 200 in accordance with the present invention. The process set forth in FIG. 4 may be performed by a computer system executing a set of instructions stored on a medium that is readable by the computer system. Such a computer system may contain a medium, such as a memory or mass storage device, that includes a plurality of URL data storage elements, which can be loaded with values.

In accordance with the set of instructions, the computer system executes a load encapsulating protocol step 220. In step 220, one of the URL data storage elements is loaded with a value corresponding to an encapsulating protocol to be identified by the URL 200.

Next, a load machine:port step 221 is executed by loading another one of the URL data storage elements with a value corresponding to a computer system to be identified by the URL 200. In one embodiment of the present invention, a value corresponding to a port in the identified computer system is also loaded into the same URL data storage element.

Step 222 follows step 221. In step 222, another URL data storage element is loaded with a value corresponding to an operation protocol key value. After step 222, a value corresponding to an operation protocol is loaded into another URL data storage element in step 223. Step 224 provides for a URL data storage element to be loaded with a value for a path field 205 in the URL 200. Finally, a value for the file name field 206 of the URL 200 is loaded into another URL data storage element in step 225. ps B. Employing the Uniform Resource Locator The URL 200 in FIG. 3A may be employed by a first computer system to gain access to a resource identified by the URL 200. The resource is maintained on a computer system that supports an operation protocol identified by the URL 200. The first computer system may either support or not support the operation protocol. If the first computer system supports the operation protocol, then it uses the operation protocol to request and receive the resource identified by the URL 200.

If the first computer system does not support the operation protocol identified by the URL 200, a second computer system may be employed. The second computer system is identified in the machine:port field 202 of the URL 200. The first computer system sends the URL 200 to the second computer system in accordance with an encapsulating protocol identified by the URL 200. The second computer system then uses the operation protocol identified by the URL 200 to request and receive the resource identified by the URL 200. The second computer system then provides the resource to the first computer system using the encapsulating protocol.

1. A Communications Network

Figure 5:
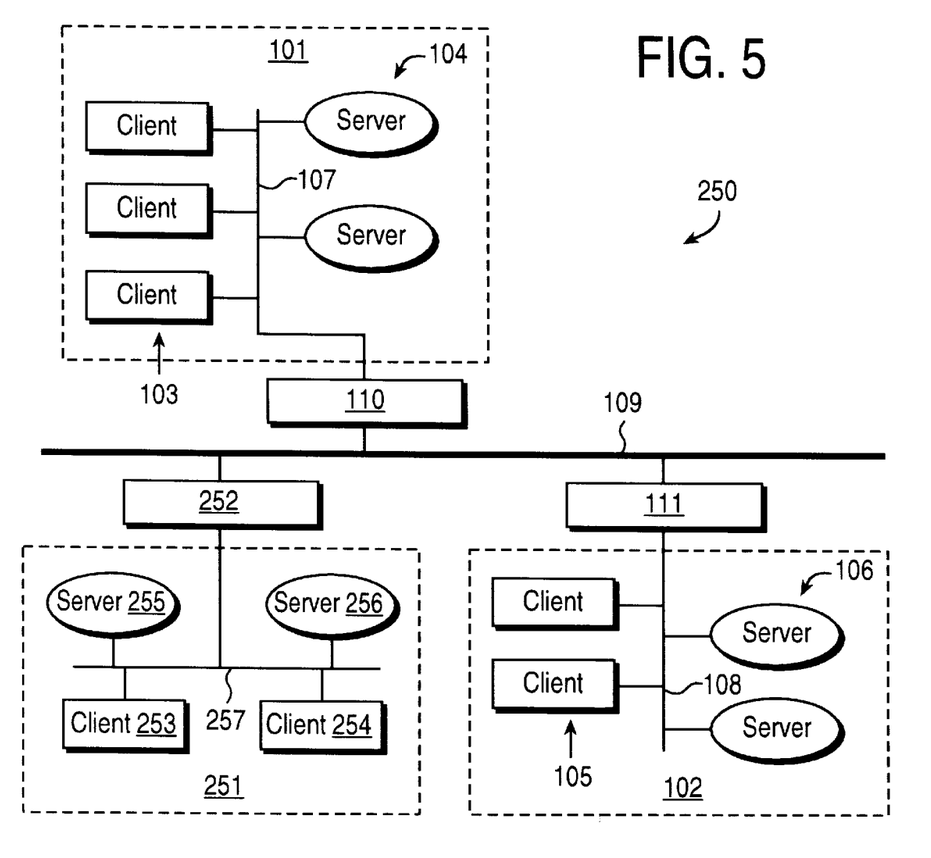
FIG. 5 illustrates a communications network in accordance with the present invention.

FIG. 5 illustrates a communications network 250 including the sub-networks 101, 102, backbone medium 109, and gateways 110, 111 shown in FIG. 1, as well as a third sub-network 251 and a third gateway 252. The elements in FIG. 5 having numbers matching elements in FIG. 1 operate as described above. The third gateway is coupled to the backbone 109 and the third sub-network 251. The third gateway 252 operates in the same manner as the first and second gateways 110, 111 to couple the third sub-network 251 into the overall communications network 250.

Each of the sub-networks 251, 101, 102 is a communications network in its own right. A communications network is merely a plurality of computer systems that are coupled together through a medium or combination of mediums for the purpose of sharing information, such as data, video, and voice signals. The term sub-network is merely used to describe one of a plurality of communications networks that are linked together to form a larger communications network.

The third sub-network 251 includes computer system 253, computer system 254, computer system 255, and computer system 256. Computer systems 253 and 254 are both client computer systems, and computer systems 255 and 256 are both server computer systems. A medium 257 is coupled to each of the computer systems 253–256 to provide for the transfer of information between the computer systems 253–256. The medium 257 is also coupled to the gateway 252 to provide for coupling the computer systems 253–256 to the backbone 109.

A medium in a communications network, such as medium 107, medium 108, medium 257, and the backbone 109, may be comprised of a single physical medium for transporting data, video, and/or voice signals. Alternatively, a communications network medium may be comprised of a plurality of mediums coupled together by repeaters, switches, routers, bridges and other local area network equipment, wide area network equipment, and telecommunications network equipment.

2. A Client Computer System

Figure 6:
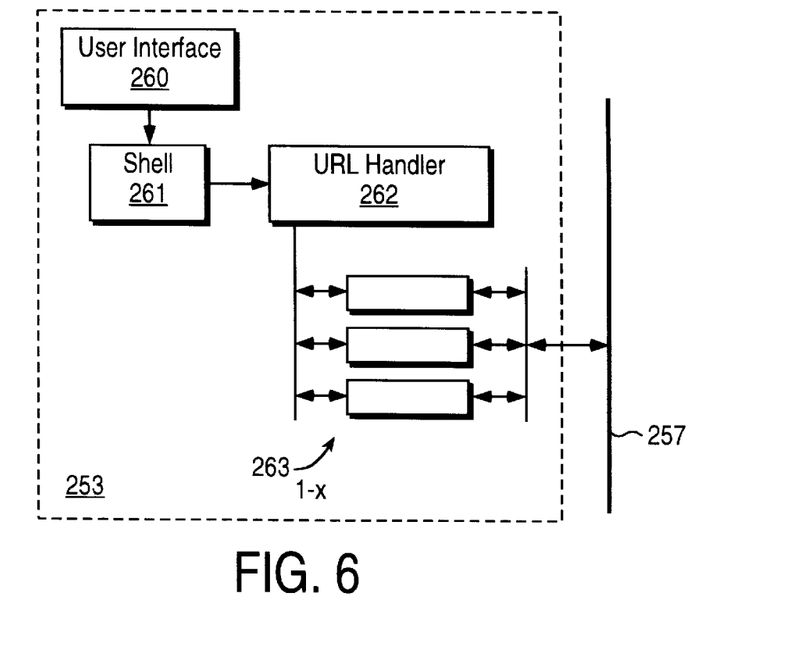
FIG. 6 illustrates functional components of a client computer system in accordance with the present invention.

FIG. 6 illustrates a functional block diagram of a client computer system in accordance with the present invention, such as computer system 253. The client computer system 253 includes a shell 261, a URL handler 262, and a set of resource viewers $263_{1-X}$ that combine to operate as a browser. The shell 261 performs the function of receiving uniform resource locators that are to be sent to other computer systems via a communications network. The shell 261 receives uniform resource locators from a user interface 260, which is coupled to the shell 261. The user interface 260 enables a user of the client computer system 253 to provide a URL in a variety of different ways. These may include manually entering a URL through a keypad and selecting a URL from an electronic mail message received from another computer system.

The shell 261 passes the URL to the URL handler 262. The URL handler 262 examines the URL to determine what protocol is to be employed in requesting a resource identified by the URL. A URL handler 262 in accordance with the present invention will detect an operation protocol, if the URL contains an operation protocol. A traditional URL handler may merely detect an encapsulating protocol in the URL.

Once a protocol for retrieving a resource is determined, the URL handler 262 invokes one of the resource viewers $263_{1-X}$. The invoked resource viewer facilitates the request for the resource and reception of the resource. Each resource viewer $263_{1-X}$ is responsible for requesting and receiving resources in accordance with a particular protocol.

For example, one resource viewer may be responsible for facilitating the request for and reception of electronic mail messages in accordance with a mail specific protocol. Another resource viewer may be responsible for requesting and receiving scheduling resources in accordance with a scheduling specific protocol. Some of the resource viewers may support standard protocols, such as http.

The resource viewers $263_{1-X}$ are coupled to the URL handler 262 and the communications medium 257. Each resource viewer $263_{1-X}$ has the ability to issue requests to and receive communications from other computer systems via the communications network 250. This allows the client computer system 253 to exchange resources, such as hypertext markup language ("HTML") documents and forms, with other computer systems.

In order to initiate contact with another computer system, a resource viewer $263_{1-X}$ is invoked by the URL handler 262. The URL handler 262 passes a URL to a resource viewer $263_{1-X}$ that supports the protocol that the URL handler 262 identified by examining the URL. If the URL handler 262 is able to detect an operation protocol in a URL, the URL will be passed to a resource viewer $263_{1-X}$ supporting the operation protocol. If the URL handler is not able to recognize an operation protocol in the URL, the URL will be passed to a resource viewer $263_{1-X}$ supporting the encapsulating protocol in the URL.

The selected resource viewer $263_{1-X}$ examines the URL to determine the resource that is being identified and the location of the resource. The resource viewer $263_{1-X}$ then issues a request over the communications network 250 for the desired resource identified in the URL. The selected resource viewer $263_{1-X}$ also receives any resource that is sent in response to the request.

For example, the resource viewer $263_{1-X}$ may request and receive an HTML type document from a server computer system. Alternatively, the resource viewer $263_{1-X}$ may perform a series of requests and receptions with another computer system to establish an object type resource locally in the client computer system 253. An object may be created when the protocol used to make the requests and receptions supports the use of an object oriented programming language, such as JAVA, via the communications network 250. In maintaining such on going communications with another computer system, the resource viewer $263_{1-X}$ performs the operations required by the protocol governing the on going communications.

JAVA is an object oriented programming language developed by Sun Microsystems for use in communications networks. More detailed information about JAVA may be obtained by accessing a Sun Microsystems Web Page using the following URL "http://java.sun.com/".

3. A Server Computer System

Figure 7:
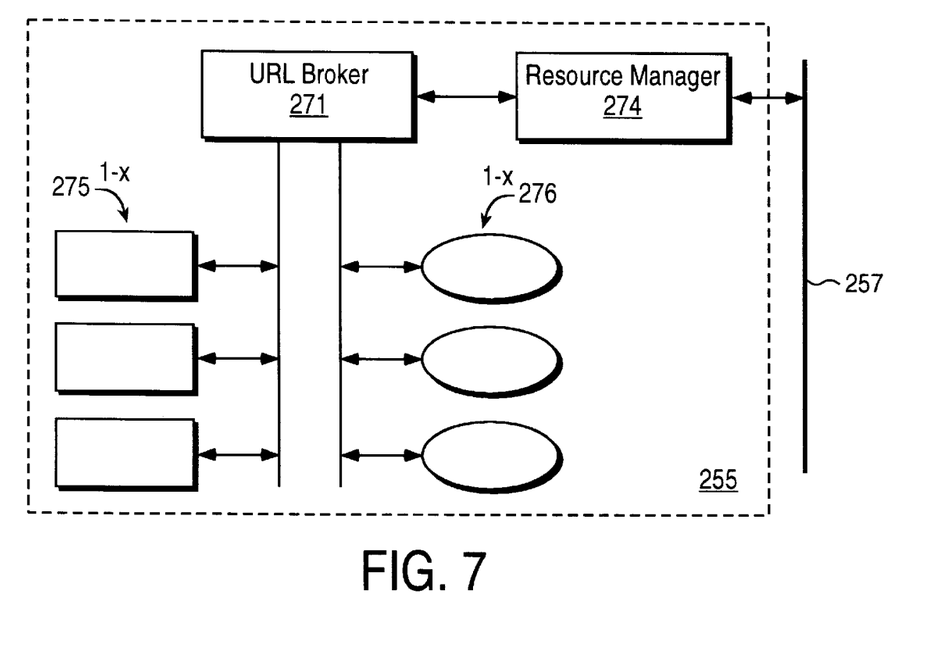
FIG. 7 illustrates functional components of a server computer system in accordance with the present invention.

FIG. 7 illustrates a functional block diagram of a server computer system in accordance with the present invention, such as server computer system 255. The server 255 includes a resource manager 274, a URL broker 271, a set of resource stores $275_{1-X}$, and a set of resource programs $276_{1-X}$, such as common gateway interface ("CGI") scripts and server-side plug-ins.

The set of resource stores $275_{1-X}$ may include one or more resource stores $275_{1-X}$. Each resource store $275_{1-X}$ contains resources that a client may access for a particular purpose. For example, one resource store $275_1$ may maintain resources related to electronic mail. The mail resources may include mail messages sent and received by clients that are supported by the server 255, as well as information about each mail message. The mail resources may also include a database relating the mail messages to each other and other resources.

Each of the resource programs $276_{1-X}$ includes a set of instructions that may be executed by the server 255. The server 255 executes a resource program in response to information contained in a URL that is received by the server 255.

The resource manager 274 is coupled to the communications medium 257. The resource manager 274 receives each incoming URL that has a protocol which is supported by the server 255. Each received URL is then passed to a URL broker 271, which is coupled to the resource manager 274. The URL broker 271 determines the action being requested by the URL. These actions may include executing a resource program or retrieving a resource from a resource store and transmitting it to another computer system on the communications network 250. The URL broker 271 invokes the appropriate resource program $276_{1-X}$ or accesses the appropriate resource store $275_{1-X}$ to provide a response to the URL request. The resource manager 274 provides for transmitting the requested resources onto the communications network 250.

4. A Client Computer System Supporting Operation Protocols

When the communications network 250 is in operation, a first computer system, such as client computer system 253, may have a URL presented to its URL handler 262 by the shell 261. The URL may conform to the URL format depicted in FIG. 3A or a traditional URL format, such as the format depicted in FIG. 2B.

Figure 8:
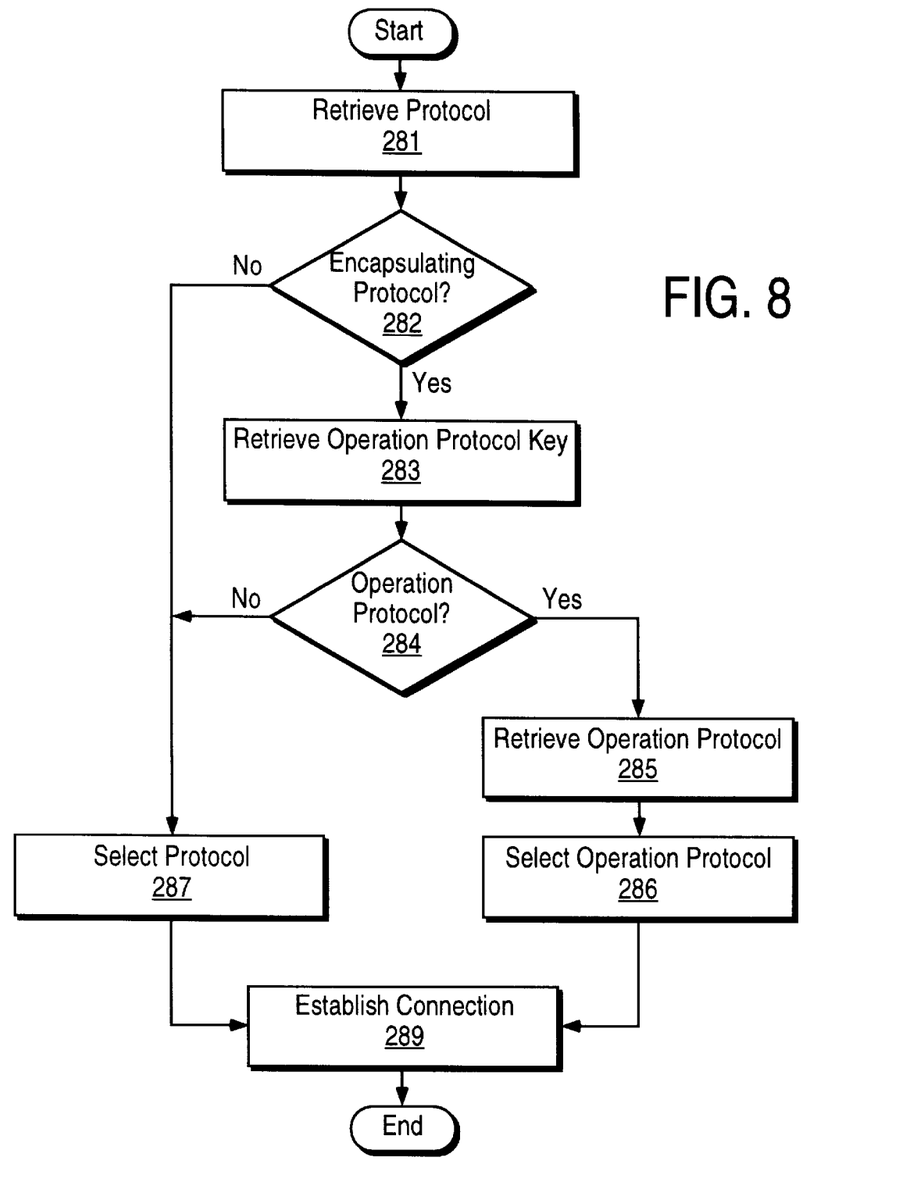
FIG. 8 illustrates a sequence of operations for a process performed by the computer system in FIG. 6 for identifying a protocol to use in accessing a computer system.

FIG. 8 illustrates a process performed by the client computer system 253, in accordance with the present invention, upon receiving the URL. The process in FIG. 8 provides for identifying and utilizing an operation protocol. The client computer system 253 may perform the process identified in FIG. 8 by executing a set of instructions stored on a computer readable medium, such as a memory or mass storage device.

In the retrieve first protocol step 281, the URL handler 262 in the client computer system retrieves the value in the encapsulating protocol field 201 of the URL. Next, in step 282, the URL handler 262 determines whether the value retrieved in step 281 corresponds to a predetermined encapsulating protocol. In one embodiment of the present invention, the predetermined encapsulating protocol is http.

If the value retrieved in step 281 does not correspond to the predetermined encapsulating protocol, step 287 is performed. The URL's failure to identify the predetermined encapsulating protocol indicates that the URL does not have a format as depicted in FIG. 3A and most likely has a traditional format. In step 287, the URL handler 262 selects a protocol for issuing a request to a computer system over the communications network 250 in accordance with the URL. In step 287 a protocol corresponding to the value retrieved in step 281 is selected. The computer system that is the target of the request is identified in the URL, as discussed with respect to the URL format in FIG. 2B. After step 287 is performed, step 289 performed.

If the value retrieved in step 281 is determined in step 282 to correspond to the encapsulating protocol, step 283 is performed. In step 283, the URL handler 262 retrieves a value in the operation protocol key field 203 of the URL. Next, in step 284, the URL handler 262 determines whether the value retrieved in step 283 indicates that a value corresponding to an operation protocol is in the URL. If a determination is made in step 284 that the URL does not contain a value corresponding to an operation protocol, step 287 is performed.

If a determination is made in step 284 that the URL does contain a value corresponding to an operation protocol, then step 285 is performed. In step 285, the URL handler 262 retrieves a value from the operation protocol field 204 in the URL. The URL handler 262 then performs step 286. In step 286, a protocol corresponding to the value retrieved in step 285 is selected as the protocol to be employed in issuing a request to a second computer system in accordance with the URL.

In step 289, a resource viewer 263 in the client 253 is selected and employs the selected protocol to issue a request to a second computer system on the communications network 250. If the selected protocol is an operation protocol, the request performed in accordance with the URL may result in the reception of an object to be generated and reside on the client computer system 253.

An object may be generated by issuing a request to the second computer system in accordance with the operation protocol and receiving a resource from the second computer system that includes a computer program. In one embodiment of the present invention, the computer program may be implemented in an object oriented computer language that supports the creation of objects. On such computer language is JAVA. Upon receiving the resource from the second computer system, the client computer system 253 executes the included computer program, which generates an object.

In accordance with the present invention, the selected resource viewer 263 may determine the identity of the second computer system based upon the operation protocol. For example, an operation protocol may be used for accessing electronic mail resources. Upon identifying such an operation protocol, the resource viewer 263 in client 253 determines that it is to issue a request to the server supporting the mail resource store for client 253. Accordingly, the resource viewer 263 issues a request to the client's 253 mail server in accordance with the operation protocol.

5. A Client Computer System Not Supporting Operation Protocols

Alternatively, a computer system, such as client computer system 254 or clients 103 and 105, may not be equipped to execute the process depicted in FIG. 8. Such client computer systems may employ traditional browsers. The traditional browser may merely look to a traditional URL 120 protocol field 121 to identify a protocol to be employed in requesting a resource identified by the URL.

In response to a URL conforming to the format in FIG. 3A, a traditional browser will cause a client computer system to forward the URL to the computer system identified in the machine:port field 202. The URL will be forwarded in accordance with the protocol identified in the encapsulating protocol field 201. In one embodiment of the present invention, the computer system identified in the machine:port field 202 may be a server computer system, such as server 255.

Figure 9:
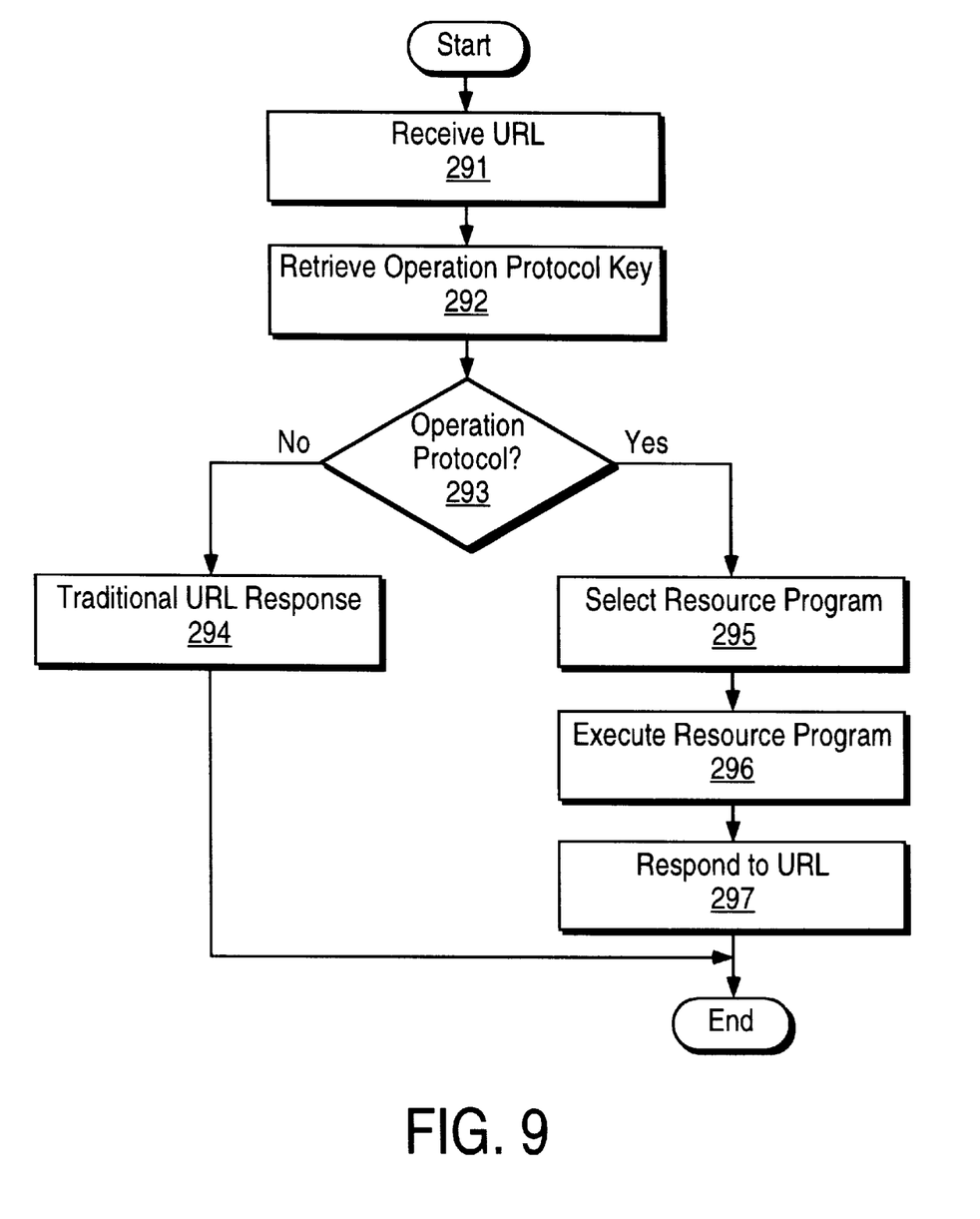
FIG. 9 illustrates a sequence of operations for a process performed by the computer system in FIG. 7 for processing a uniform resource locator.

FIG. 9 depicts a process performed by a server computer system, such as server 255, upon receiving a URL from a client computer system. In accordance with the present invention, the process depicted in FIG. 9 may be performed by the server computer system 255 executing a set of instruction stored on a computer readable medium, such as a memory or mass storage device.

In step 291, the resource manager 274 receives a URL from a client computer system over the communications network 250 and passes it to the server's URL broker 271. Next, in step 292, the URL broker 271 retrieves a value from the operation protocol key field 203 in the URL. Once this value is retrieved, the URL broker 271 performs step 293 to determine whether the retrieved value indicates that the URL contains a value corresponding to an operation protocol. If it is determined that the URL does not identify an operation protocol, then step 294 is performed. In step 294, the URL broker 271 services the URL in a traditional manner by either having a resource program $276_{1-X}$ executed or retrieving a resource in accordance with the information provided by the URL. The retrieved resource may be provided to the resource manager 274, which forwards the resource to the requesting computer system.

Step 295 is performed if it is determined that the URL contains a value corresponding to an operation protocol. In step 295, the URL broker 271 selects a resource program $276_{1-X}$ to be executed by the server 255. The URL broker 271 makes this selection by retrieving the value in the operation protocol field 204 and selecting a resource program $276_{1-X}$ that corresponds to this value. Next, in step 296, the server 255 executes the resource program $276_{1-X}$ selected in step 295.

The executed program may cause the server 255 to access another server in accordance with an operation protocol corresponding to the value retrieved in step 295. In one embodiment of the present invention, the accessed server is physically distinct from server 255 and is accessed over the communications network 250. For example, server computer system 256 may be the accessed server. In an alternate embodiment of the present invention, the accessed server resides in the same computer system as server 255 but is logically distinct from server 255.

After the server 255 executes the program in step 296, a response is provided to the client computer system, which originally sent the URL to server 255. The URL broker 271 forwards the response to the resource manager 274, which transmits the response to the client computer system. The response is transmitted in accordance with the encapsulating protocol identified by the URL.

The execution of step 296 may have resulted in the server 255 retrieving a resource identified in the URL. In step 297, the server 255 may transmit this resource over the communications network 250 to the client computer system that originally sent the URL to server 255. In accordance with the present invention, the desired resource may be transmitted as a HTML document, using a standard protocol such as http. If the performance of step 296 did not result in any resource being retrieved, no response may be provided in step 297.

Figure 10:
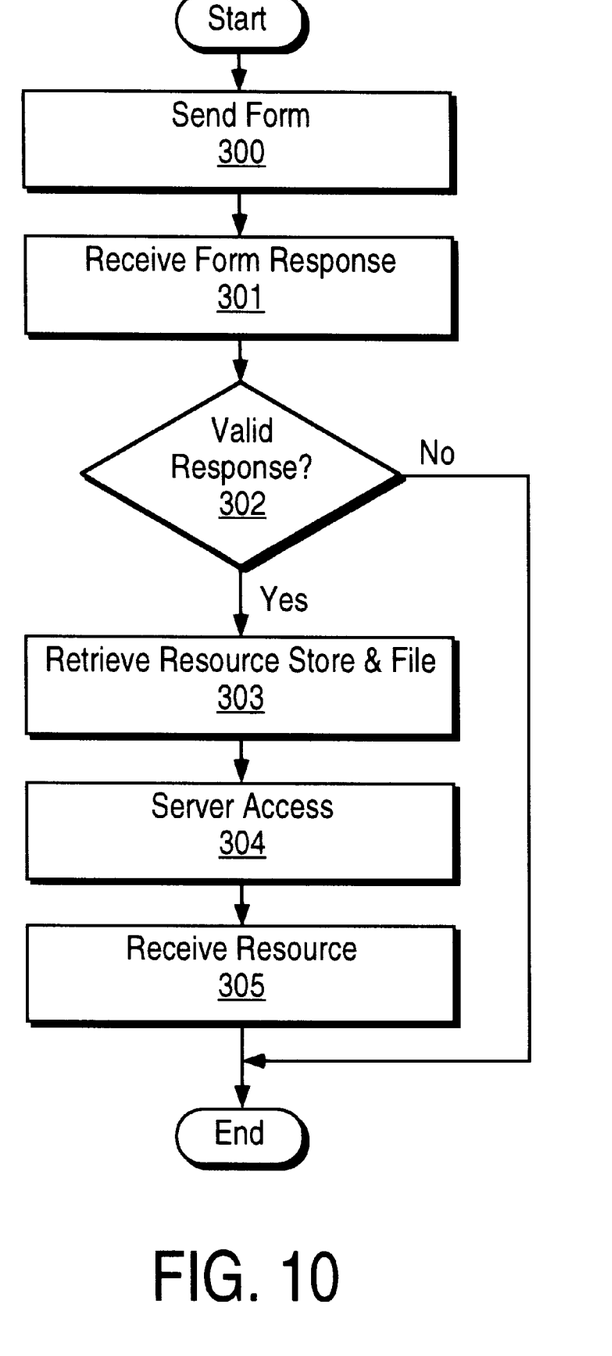
FIG. 10 illustrates a sequence of operations performed by a computer system in the step of executing a resource program that is illustrated in FIG. 9.

FIG. 10 illustrates a sequence of operations that may be performed by the server 255 in response to the instructions in the selected resource program 276 that is executed in step 296. In step 300, server 255 transmits a document to the client computer system in accordance with the encapsulating protocol identified by the URL. The document includes a form that prompts the user of the client computer system to supply the server 255 with a response. In accordance with the present invention, the document, including the form, may conform to the hypertext markup language. Next, in step 301, the server 255 receives the response from the client computer system.

After receiving the response in step 301, step 302 is performed. In step 302, the server 255 determines whether the response is valid. If the response is not valid, the server 255 stops executing the selected resource program. A determination of a response's validity may be performed by comparing the response to a predetermined password or set of data.

If the response is valid, server 255 performs step 303. In step 303, the server 255 retrieves the values from the path field 205 and file name field 206 of the URL, which was received in step 291. This is done to identify the location of a resource desired by the client computer system. Next, in step 304, the server 255 accesses a resource store in another server that contains the desired resource, in accordance with the operation protocol identified by the URL received in step 291. In step 305, the server 255 receives the desired resource from the other server.

C. Computer System Hardware

Figure 11:
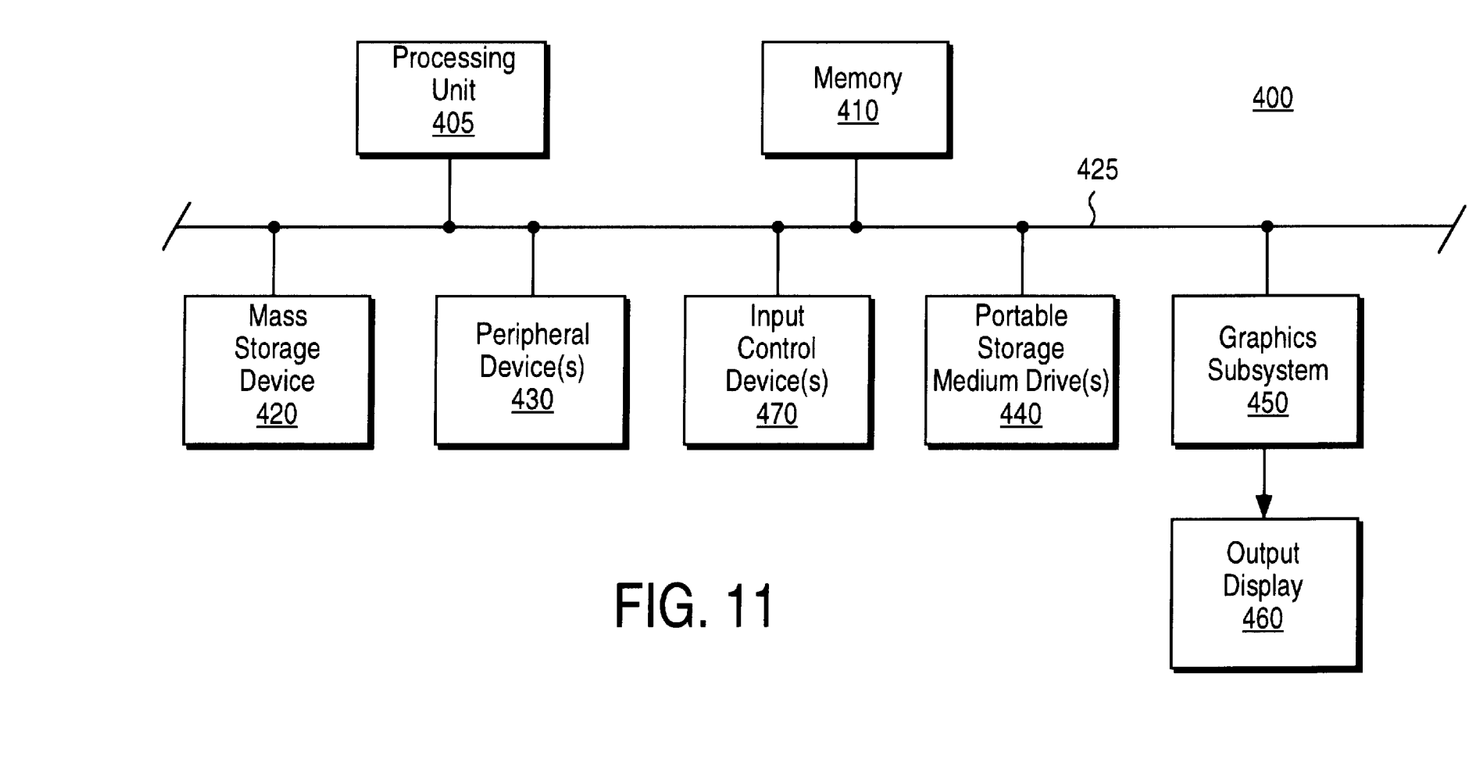
FIG. 11 illustrates computer system hardware that may be employed to operate as either the client computer system in FIG. 6 or the server computer system in FIG. 7.

FIG. 11 illustrates a high level block diagram of a general purpose computer system 400, which may be employed in embodiments of the present invention as a server computer system 255, 256 or a client computer system 253, 254. Accordingly, the computer system may be employed for performing a number of processes, including those illustrated in FIGS. 4, 8, 9, and 10.

The computer system 400 contains a processing unit 405, main memory 410, and an interconnect bus 425. The processing unit 405 may contain a single microprocessor, or may contain a plurality of microprocessors for configuring the computer system 400 as a multi-processor system. The main memory 410 stores, in part, instructions and data for execution by the processing unit 405. If a process, such as the processes illustrated in FIGS. 4, 8, 9, and 10, is wholly or partially implemented in software, the main memory 410 may store the executable instructions for implementing the process when the computer is in operation. The main memory 410 may also store the plurality of URL data storage elements. The main memory 410 may include banks of dynamic random access memory (DRAM) as well as high speed cache memory.

The computer system 400 may further include a mass storage device 420, peripheral device(s) 430, portable storage medium drive(s) 440, input control device(s) 470, a graphics subsystem 450, and an output display 460. For purposes of simplicity, all components in the computer system 400 are shown in FIG. 11 as being connected via the bus 425. However, the computer system 400 may be connected through one or more data transport means. For example, the processor unit 405 and the main memory 410 may be connected via a local microprocessor bus, and the mass storage device 420, peripheral device(s) 430, portable storage medium drive(s) 440, and graphics subsystem 450 may be connected via one or more input/output (I/O) busses.

The mass storage device 420, which may be implemented with a magnetic disk drive or an optical disk drive, is a non-volatile storage device for storing data and instructions for use by the processor unit 405. In software embodiments of the present invention, the mass storage device 420 may store the instructions executed by the computer system 400 to perform processes, such as those illustrate in FIGS. 4, 8, 9, and 10. The mass storage device 420 may also store the plurality of URL data storage elements.

The portable storage medium drive 440 operates in conjunction with a portable non-volatile storage medium, such as a floppy disk, a compact disc read only memory (CD-ROM), or an integrated circuit non-volatile memory adapter (i.e. PC-MCIA adapter) to input and output data and code to and from the computer system 400. In one embodiment, the instructions for enabling the computer system to execute processes, such as those illustrated in FIGS. 4, 8, 9, and 10, are stored on such a portable medium, and are input to the computer system 400 via the portable storage medium drive 440.

The peripheral device(s) 430 may include any type of computer support device, such as an input/output (I/O) interface, to add additional functionality to the computer system 400. For example, the peripheral device(s) 430 may include a communications controller, such as a network interface card or integrated circuit, for interfacing the computer system 400 to a communications network. Instructions for enabling the computer system to perform processes, such as those illustrated in FIGS. 4, 8, 9, and 10, may be down loaded into the computer system's main memory 410 over a communications network.

The input control device(s) 470 provide a portion of the user interface for a user of the computer system 400. The input control device(s) 470 may include an alphanumeric keypad for inputting alphanumeric and other key information, a cursor control device, such as a mouse, a trackball, stylus, or cursor direction keys.

In order to display textual and graphical information, the computer system 400 contains the graphics subsystem 450 and the output display 460. The output display 460 may include a cathode ray tube (CRT) display or liquid crystal display (LCD). The graphics subsystem 450 receives textual and graphical information, and processes the information for output to the output display 460. The components contained in the computer system 400 are those typically found in general purpose computer systems, and in fact, these components are intended to represent a broad category of such computer components that are well known in the art.

The processes steps and other functions described above with respect to embodiments of the present invention may be implemented as software instructions. More particularly, the process steps illustrated in FIGS. 4, 8, 9, and 10, as well as the shell 261, URL handler 262, resource viewers 263₁₋ₓ, resource manager 274, and URL broker 271 may be implemented as software instructions. For the preferred software implementation, the software includes a plurality of computer executable instructions for implementation on a general purpose computer system. Prior to loading into a general purpose computer system, the software instructions may reside as encoded information on a computer readable medium, such as a magnetic floppy disk, magnetic tape, and compact disc read only memory (CD-ROM). In one hardware implementation, circuits may be developed to perform the process steps and other functions described herein.

Although the present invention has been described in terms of specific exemplary embodiments, it will be appreciated that various modifications and alterations might be made by those skilled in the art without departing from the spirit and scope of the invention.

What is claimed is:

1. A method for performing an operation over a communications network based on a uniform resource locator, wherein a protocol is to be employed by a first computer system in issuing a communication to a second computer system over the communications network, said method comprising the steps of:
    (a) determining whether the uniform resource locator contains a first value corresponding to an encapsulating protocol;
    (b) determining whether the uniform resource locator contains an operation protocol key indicating that the uniform resource locator contains a second value corresponding to an operation protocol, if a determination is made in said step (a) that the uniform resource locator contains said first value corresponding to said encapsulating protocol; and
    (c) selecting said operation protocol as the protocol to be employed by the first computer system in issuing the communication to the second computer system, if said determination in said step (b) indicates that the uniform resource locator contains said second value corresponding to said operation protocol.

2. A method as called for in claim 1, further including:
    (d) generating an object that resides in the first computer system.

3. A method as called for in claim 2, wherein said step (d) includes:
    issuing a communication to the second computer system in accordance with said operation protocol over the communications network;
    receiving a resource from said second computer system over the communications network; and
    executing a computer program that creates said object.

4. A method for processing a uniform resource locator that is received by a second computer system from a first computer system over a communications network, said method comprising the steps of:
    (a) determining whether the uniform resource locator received by the second computer system contains a first value corresponding to an operation protocol; and
    (b) providing a resource targeted to the first computer system in accordance with an encapsulating protocol identified by a second value in the uniform resource locator, wherenin said resource is provided from a resource store that is accessed in accordance with said operation protocol, if said determination in said step (a) indicates that the uniform resource locator contains said first value corresponding to said operation protocol.

5. A method as called for in claim 4, wherein said step (a) includes determining whether an operation protocol field in the uniform resource locator contains said first value corresponding to said operation protocol.

6. A method as called for in claim 4, wherein said step (b) includes executing a computer program corresponding to said operation protocol.

7. A method as called for in claim 6, wherein said computer program is a common gateway interface residing in the second computer system.

8. A method as called for in claim 7, wherein said computer program is a server side plug in residing in the second computer system.

9. A method as called for in claim 4, wherein said step (b) includes:
    accessing said resource store in accordance with said operation protocol; and
    transmitting said resource targeted to the first computer system from said resource store over the communications network in accordance with said encapsulating protocol.

10. A method as called for in claim 9, wherein said resource store is identified in the uniform resource locator .

11. A method as called for in claim 9, wherein said resource is a document.

12. A method as called for in claim 11, wherein said step (b) further includes:
    transmitting a form targeted to the first computer system over the communications network in accordance with said encapsulating protocol;
    receiving a response to said form from the first computer system; and
    determining whether said response to said form is valid.

13. A method as called for in claim 12, wherein said document is a hypertext markup language document.

14. A method for constructing a uniform resource locator in a computer readable medium having a plurality of data storage elements, said method comprising the steps of:
    (a) loading one of the plurality of data storage elements with a first value corresponding to an encapsulating protocol; and
    (b) loading one of the plurality of data storage elements with a second value corresponding to an operation protocol.

15. A method as called for in claim 14, further including the step of:
    (c) loading one of the plurality of data storage elements with an operation protocol key value indicating the presence of said second value corresponding to said operation protocol in said computer readable medium.

16. A method as called for in claim 14, further including the steps of:
    (c) loading one of the plurality of data storage elements with a third value corresponding to a resource store that may be accessed according to said operation protocol; and
    (d) loading one of the plurality of data storage elements with a fourth value corresponding to a resource in said resource store.

17. A computer readable medium having a set of instructions stored therein for enabling a computer to determine a protocol, based on a uniform resource locator, to be employed by the computer in issuing a communication to a second computer over a communications network, said set of instructions including:

instructions, which when executed by the computer cause the computer to determine whether the uniform resource locator contains a first value corresponding to an encapsulating protocol;

instructions, which when executed by the computer cause the computer to determine whether the uniform resource locator contains an operation protocol key indicating that the uniform resource locator contains a second value corresponding to an operation protocol; and instructions, which when executed by the computer causes the computer to select said operation protocol as the protocol to be employed by the computer in issuing the communication to the second computer.

18. A computer readable medium as called for in claim 17, where in said set of instructions further includes:

instructions, which when executed by the computer cause the computer to issue the communication to the second computer system in accordance with said operation protocol;

instructions, which when executed by the computer cause the computer to receive a resource from said second computer system; and instructions, which when executed by the computer cause the computer to execute a computer program that creates an object.

19. A computer readable medium having a set of instructions stored therein for processing a uniform resource locator that is received by a computer from a first computer over a communications network, said set of instructions including:

instructions, which when executed by the computer cause the computer to determine whether the uniform resource locator contains a first value corresponding to an operation protocol; and instructions, which when executed by the computer cause the computer to execute a computer program corresponding to said first value for accessing a resource store in accordance with said operation protocol.

20. A computer readable medium as called for in claim 19, wherein said set of instructions further includes:

instructions, which when executed by the computer cause the computer to provide a resource targeted to the first computer in accordance with an encapsulating protocol identified by a second value in said uniform resource locator, wherein said resource has been obtained from said resource store in accordance with said operation protocol.

21. A computer readable medium as called for in claim 20, wherein said resource is a document.

22. A computer readable medium as called for in claim 21, wherein said set of instructions further includes:

instructions, which when executed by the computer cause the computer to provide a form targeted to the first computer in accordance with an encapsulating protocol identified by a second value in said uniform resource locator;

instructions, which when executed by the computer cause the computer to receive a response to said form from the first computer; and instructions, which when executed by the computer cause the computer to execute said computer program to determine whether said response to said form is valid.

23. A computer readable medium as called for in claim 22, wherein said document is a hypertext markup language document.

24. A first computer readable medium having a set of instructions stored therein for enabling a computer to construct a uniform resource locator in a second computer readable medium having a plurality of data storage elements, said set of instructions including:

instructions, which when executed by the computer cause the computer to load one of the plurality of data storage elements with a first value corresponding to an encapsulating protocol; and instructions, which when executed by the computer cause the computer to load one of the plurality of data storage elements with a second value corresponding to an operation protocol.

25. A first computer readable medium as called for in claim 23, wherein said set of instructions further includes:

instructions, which when executed by the computer cause the computer to load one of the plurality of data storage elements with an operation protocol key value indicating the presence of said second value corresponding to said operation protocol in said second computer readable medium;

instructions, which when executed by the computer cause the computer to load one of the plurality of data storage elements with a third value corresponding to a resource store that is accessed according to said operation protocol; and instructions, which when executed by the computer cause the computer to load one of the plurality of data storage elements with a fourth value corresponding to a resource in said resource store.

26. A client computer system for use in a communications network having a second computer system coupled thereto, said client computer system comprising:

a processing unit; and a processing unit readable medium coupled to said processing unit, said processing unit readable medium having a set of instructions stored therein for enabling said client computer system to determine a protocol, based on a uniform resource locator, to be employed by said client computer system in issuing a communication to the second computer system, said set of instructions including:

instructions, which when executed by said processing unit cause said processing unit to determine whether the uniform resource locator contains a first value corresponding to an encapsulating protocol;

instructions, which when executed by the processing unit cause the processing unit to determine whether the uniform resource locator contains an operation protocol key indicating that the uniform resource locator contains a second value corresponding to an operation protocol, and instructions, which when executed by said processing unit cause said processing unit to select said operation protocol as the protocol to be employed in issuing the communication to the second computer system.

27. A client computer system as called for in claim 26, wherein said set of instructions further includes:

instructions, which when executed by said processing unit cause said client computer system to issue the communication to the second computer system in accordance with said operation protocol, instructions, which when executed by said processing unit cause said client computer system to receive a resource from said second computer system, and instructions, which when executed by said processing unit cause said client computer system to execute a computer program that creates an object.

28. A server computer system for use in a communications network having a first computer system coupled thereto, said server computer system comprising:

a processing unit; and a processing unit readable medium coupled to said processing unit, said processing unit readable medium having a set of instructions stored therein for enabling said server computer system to process a uniform resource locator that is received by said server computer system from the first computer system over said communications network, said set of instructions including:

instructions, which when executed by said processing unit cause said processing unit to determine whether said uniform resource locator contains a first value corresponding to an operational protocol, instructions, which when executed by said processing unit cause said server computer system to a ccess a resource store in accordance with said operation protocol, and instructions, which when executed by said processing unit cause said server computer system to provide a resource from said resource store targeted to the first computer in accordance with an encapsulating protocol.

29. A server computer system as called for in claim 28, wherein said encapsulating protocol is identified by a second value in said uniform resource locator received by said server computer system.

* * * * *